United States Patent
Chang

(10) Patent No.: US 11,481,360 B2
(45) Date of Patent: Oct. 25, 2022

(54) BLOCKCHAIN NETWORK AND METHOD OF OPERATION THEREOF

(71) Applicant: Hwa-Shang Chang, Milpitas, CA (US)

(72) Inventor: Hwa-Shang Chang, Milpitas, CA (US)

( * ) Notice: Subject to any disclaimer, the term of this patent is extended or adjusted under 35 U.S.C. 154(b) by 87 days.

(21) Appl. No.: 16/603,015

(22) PCT Filed: Apr. 7, 2017

(86) PCT No.: PCT/US2017/026499
§ 371 (c)(1),
(2) Date: Oct. 4, 2019

(87) PCT Pub. No.: WO2018/186874
PCT Pub. Date: Oct. 11, 2018

(65) Prior Publication Data
US 2020/0192873 A1  Jun. 18, 2020

(51) Int. Cl.
G06F 16/182 (2019.01)
H04L 9/06 (2006.01)
H04L 9/32 (2006.01)

(52) U.S. Cl.
CPC ........ *G06F 16/1837* (2019.01); *H04L 9/0637* (2013.01); *H04L 9/3236* (2013.01); *H04L 9/3297* (2013.01)

(58) Field of Classification Search
CPC . G06F 16/1837; H04L 9/0637; H04L 9/3236; H04L 9/3297; H04L 2209/38; H04L 67/104
See application file for complete search history.

(56) References Cited

U.S. PATENT DOCUMENTS

| 9,635,000 | B1* | 4/2017 | Muftic | H04L 9/3239 |
| 10,833,864 | B2* | 11/2020 | Masini | G06Q 20/223 |
| 2013/0031367 | A1* | 1/2013 | Mao | H04L 63/10 713/168 |

(Continued)

FOREIGN PATENT DOCUMENTS

| WO | WO 2016/179334 A1 | 11/2016 |
| WO | WO 2016/186873 A1 | 11/2016 |
| WO | WO 2017/007806 A1 | 1/2017 |

OTHER PUBLICATIONS

Office Action from Taiwan Patent Office in the corresponding Taiwanese patent application No. 20170131932 filed on Sep. 18, 2017 with 9 pages in Chinese, with 1 page of English translation of summary.

*Primary Examiner* — Ivan O Latorre
(74) *Attorney, Agent, or Firm* — Juan Carlos A. Marquez; Marquez IP Law Office, PLLC

(57) ABSTRACT

A blockchain network, in which each node is able to be dynamically assigned different function for a given transaction that can be executed in parallel, includes a first node configured to send a transaction validation request for a transaction using a peer-to-peer (P2P) network; and a second node, configured to validate the transaction in response to the transaction validation request from the first node, and further configured to inform the first node of an approval of the transaction using a P2P network in response to the validation. The first node sends a notification message indicating completion of the transaction to a third node using a P2P network in response to the approval.

16 Claims, 5 Drawing Sheets

(56) References Cited

U.S. PATENT DOCUMENTS

| | | | |
|---|---|---|---|
| 2015/0363772 A1* | 12/2015 | Ronca | G06Q 20/3829 |
| | | | 705/71 |
| 2015/0363777 A1* | 12/2015 | Ronca | H04L 9/3236 |
| | | | 705/75 |
| 2016/0260171 A1* | 9/2016 | Ford | G06Q 20/389 |
| 2016/0342989 A1* | 11/2016 | Davis | G06Q 20/385 |
| 2017/0140408 A1* | 5/2017 | Wuehler | G06Q 30/0207 |
| 2017/0149819 A1* | 5/2017 | Androulaki | H04L 63/0823 |
| 2018/0150835 A1* | 5/2018 | Hunt | H04L 9/3236 |
| 2018/0158034 A1* | 6/2018 | Hunt | G06Q 20/027 |
| 2018/0255090 A1* | 9/2018 | Kozloski | H04L 67/22 |
| 2018/0255130 A1* | 9/2018 | Kozloski | H04L 9/3239 |
| 2018/0323964 A1* | 11/2018 | Watanabe | G06F 16/27 |
| 2018/0342171 A1* | 11/2018 | Darnell | G06Q 20/065 |
| 2019/0036702 A1* | 1/2019 | Kano | H04L 9/32 |
| 2019/0109717 A1* | 4/2019 | Reddy | H04L 63/1433 |
| 2019/0244227 A1* | 8/2019 | Inoue | G06Q 30/0201 |
| 2020/0022126 A1* | 1/2020 | You | H04W 80/02 |

\* cited by examiner

BLOCKCHAIN NETWORK AND METHOD OF OPERATION THEREOF

TECHNICAL FIELD

The present disclosure relates to a blockchain network, and more particularly, to a blockchain network using an overlay peer-to-peer network.

DISCUSSION OF THE BACKGROUND

Today, a type of virtual currency known as cryptocurrency, such as bitcoin, is gaining acceptance as viable media for executing purchase transactions and other financial transactions. The transfer of units of cryptocurrency between owners relies on a robust blockchain ledger structure that, due to its public nature, redundant verification, and resistance to fraudulent activity, offers advantages over existing centralized server systems. Effective functioning of the blockchain structure is essential to the adoption and success of such cryptocurrency.

This Discussion of the Background section is provided for background information only. The statements in this Discussion of the Background are not an admission that the subject matter disclosed in this section constitutes prior art to the present disclosure, and no part of this section may be used as an admission that any part of this application, including this Discussion of the Background section, constitutes prior art to the present disclosure.

SUMMARY

One aspect of the present disclosure provides a blockchain network. Each node in the blockchain network is able to be dynamically assigned different function for a given transaction that can be executed in parallel. The blockchain network includes a first node configured to send a transaction validation request for a transaction using a peer-to-peer (P2P) network; and a second node, configured to validate the transaction in response to the transaction validation request from the first node, and further configured to inform the first node of an approval of the transaction using a P2P network. The first node sends a notification message indicating completion of the transaction to a third node using a P2P network in response to the approval.

In some embodiments, the first node is further configured to receive a transaction request associated with the transaction.

In some embodiments, the first node is further configured to determine that between the second node and a fourth node the second node is in charge of a validation of the transaction.

In some embodiments, the first node is further configured to broadcast an information, that does not include a virtual currency, to the blockchain network and store the information in blockchain's ledger.

In some embodiments, the first node simultaneously sends the notification message and broadcasts the information.

In some embodiments, the blockchain network further includes a fifth node configured to record the information in a ledger of the blockchain network.

In some embodiments, the blockchain network further includes a sixth node, wherein the sixth node and the second node are configured to settle the transaction therebetween based on the information in the ledger.

In some embodiments, the blockchain network further includes a sixth node; and a seventh node configured to, based on the information in the ledger, activate the second node and the sixth node to settle the transaction therebetween.

Each transaction can have its own set of nodes analogous to the set of the nodes including the first node to the seventh node in the overall blockchain network.

Another aspect of the present disclosure provides a method of operating a blockchain network. The method includes sending a transaction validation request for a transaction by a first node to a second node using a P2P network; validating the transaction by the second node in response to the transaction validation request from the first node; informing the first node of an approval of the transaction by the second node using a P2P network in response to the validation; and, in response to the approval, sending a notification message indicating completion of the transaction by the first node to a third node using a P2P network.

In some embodiments, the method further includes receiving a transaction request associated with the transaction by the first node.

In some embodiments, the method further includes determining by the first node that between the second node and a fourth node the second node is in charge of a validation of the transaction.

In some embodiments, the method further includes broadcasting an information, that does not include a virtual currency, to the blockchain network by the first node.

In some embodiments, the step of sending the notification message and broadcasting the information includes simultaneously sending the notification message and broadcasting the information.

In some embodiments, the method further includes recording the information in a ledger of the blockchain network.

In some embodiments, the method further includes settling the transaction between a sixth node and the second node based on the information in the ledger.

In some embodiments, the method further includes activating the second node and a sixth node based on the information in the ledger to settle the transaction between the second node and sixth node.

In the present disclosure, each node of the blockchain network may have its own function. For example, the validation operation may be performed by a single node, instead of being performed by all of the nodes. The subsequent proof of work (PoW) computation operation is also performed by the single node. As a result, performance of the blockchain network is relatively high.

In contrast, in some existing blockchain networks, all nodes in the existing blockchain network are homogeneous, and all perform the same function. For example, a validation operation is performed by all of the nodes. All of the nodes perform the same validation operation, and then perform the subsequent PoW computation operation. If all of the nodes, or most of the nodes, reach consensus, the transaction is approved. However, the nodes may not have the same computational speed. Therefore, some of the nodes may have already completed the validation operation and the PoW computation operation while other nodes may not yet have completed the validation operation and the PoW computation operation. Time would then be spent inefficiently waiting for other nodes to complete their operations. Accordingly, performance of such a blockchain network is relatively low, and a real-time transaction cannot be executed.

Moreover, in the present disclosure, a transaction between a first user and a second user does not involve virtual currency. There is no need for the first user to convert his real currency through exchanges to buy and store virtual currency in a ledger of a blockchain network. Therefore, a node representing the first user does not transfer virtual currency to another node representing the second user during the process of the transaction. The node only broadcasts information that does not include virtual currency to the blockchain network. Therefore, for both the first user and the second user, there is no risk of loss due to fluctuation in exchange rate between the real currency and the virtual currency.

In the present disclosure, nodes of a blockchain system are given different functions. As such, each of the nodes can be given a specific function different from functions assigned to other nodes depending on different transactions. That is, each transaction can have its own set of nodes analogous to the set of the nodes including the first node to the seventh node in the blockchain network. Each transaction can be processed in parallel. Therefore, scalability of the blockchain system is relatively high.

In contrast, in some existing blockchain networks, all nodes in the existing blockchain network are homogeneous, and perform the same function. Therefore, scalability of the existing blockchain system is relatively low.

The foregoing has outlined rather broadly the features and technical advantages of the present disclosure in order that the detailed description of the disclosure that follows may be better understood. Additional features and advantages of the disclosure are described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Figure 1:
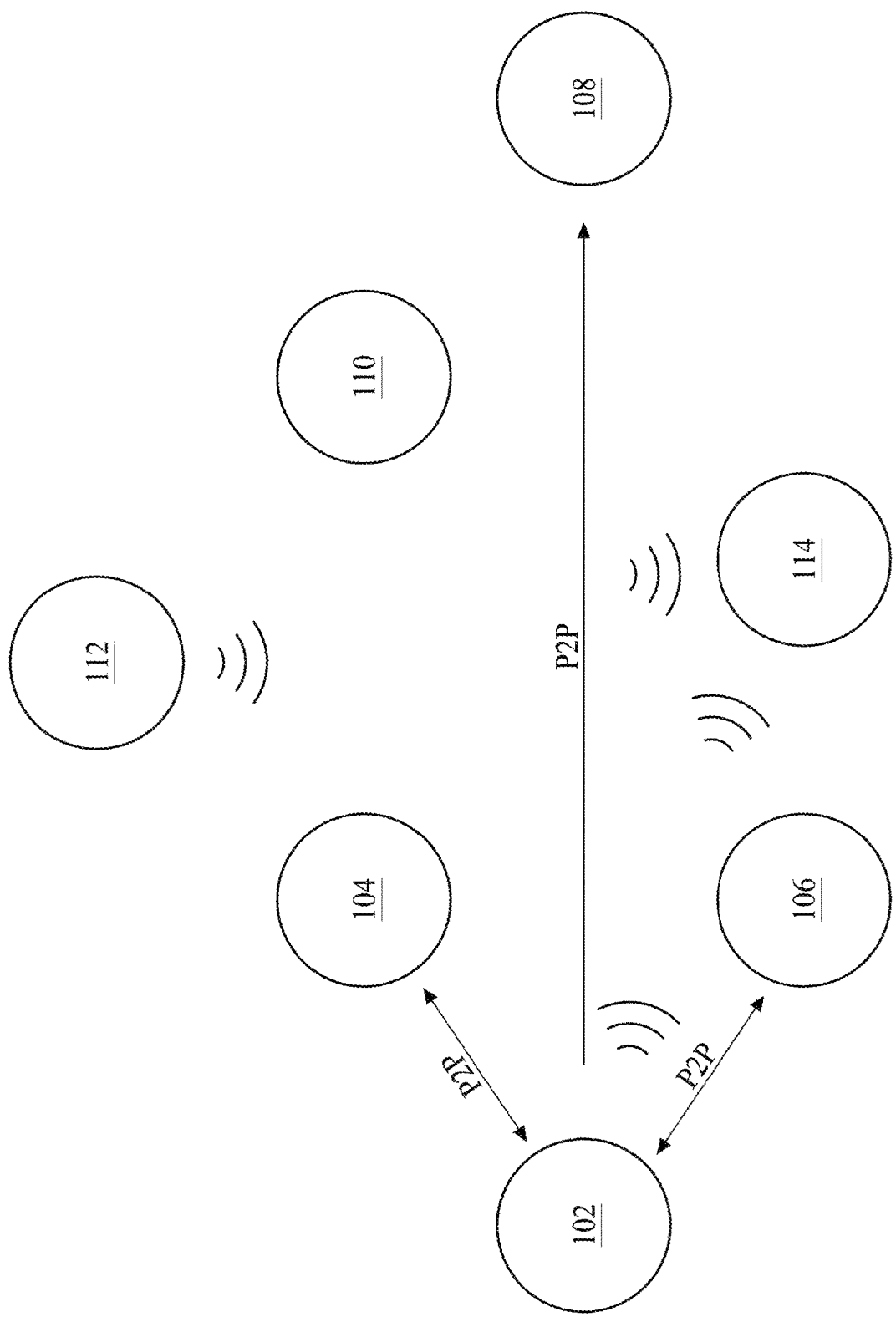
FIG. 1 is a diagram of a blockchain network in accordance with some embodiments of the present disclosure.

Embodiments, or examples, of the disclosure illustrated in the drawings are now described using specific language. It shall be understood that no limitation of the scope of the disclosure is thereby intended. Any alteration or modification to the described embodiments, and any further applications of principles described in this document, are to be considered as normally occurring to one of ordinary skill in the art to which the disclosure relates. Reference numerals may be repeated throughout the embodiments, but this does not necessarily require that feature(s) of one embodiment apply to another embodiment, even if they share the same reference numeral.

It shall be understood that when an element is referred to as being "connected to" or "coupled with" another element, it may be directly connected to or coupled to the other element, or intervening elements may be present.

It shall be understood that, although the terms first, second, third, etc. may be used herein to describe various elements, components, regions, layers or sections, these elements, components, regions, layers or sections should not be limited by these terms. Rather, these terms are merely used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It shall be further understood that the terms "comprises" and "comprising," when used in this specification, specify the presence of stated features, integers, steps, operations, elements, or components, but do not preclude the presence or addition of one or more other features, integers, steps, operations, elements, components, or groups thereof.

FIG. 1 is a diagram of a blockchain network 10 in accordance with some embodiments of the present disclosure. Referring to FIG. 1, the blockchain network 10 includes a first node 102, a second node 104, a third node 108, a fourth node 106, a fifth node 114, a sixth node 110 and a seventh node 112. In the present disclosure, functions of the first node 102, the second node 104, the third node 108, the fourth node 106, the fifth node 114, the sixth node 110 and the seventh node 112 are not necessarily the same (that is, those nodes are not necessarily homogeneous), as will be described in detail below.

The first node 102 functions to receive a transaction request associated with a transaction from a first user in response to an event wherein the first user initializes the transaction with a second user. Furthermore, the first node 102 functions to determine which of the second node 104 and the fourth node 106 is in charge of a validation of the transaction associated with the transaction request. Additionally, the first node 102 functions to send a transaction validation request for the transaction to the determined node using a peer-to-peer (P2P) network. For example, when the first node 102 determines that the second node 104 is in charge of a transaction associated with a transaction from the first user, the first node 102 sends a transaction validation request to the second node 104. Furthermore, the first node 102 functions to send a notification message indicating completion of a transaction to the third node 108 using a P2P network. In the present disclosure, a transaction between the first user and the second user does not involve virtual currency. The first node 102 does not send virtual currency to the third node 108 or to other nodes in the blockchain network 10.

Additionally, the first node 102 functions to broadcast information that does not include a virtual currency to the blockchain network 10. The information is recorded in a ledger of the blockchain network 10. For example, the first node 102 broadcasts the information to all nodes in the blockchain network 10. The nodes in the blockchain network 10 manage the ledger in common. The ledger is a text transaction statement, and does not record virtual currency. In further detail, each of the nodes has a copy of the ledger, and the information is recorded in the copy of the ledger of each of the nodes. For example, the fifth node 114 records the information in its copy of the ledger. The information, in the present disclosure, refers to a signed transaction. The signed transaction includes an approval number associated with the second node 104, an address of the sixth node 110 serving as a transaction destination node, and a token of an account of the second user.

The second node 104 is in charge of a validation of a first type of transaction, and functions to validate the first type of transaction. For example, the second node 104 is implemented with, for example, a server of a bank. The bank manages an account of the first user. The first user has real currency in the account. That is, the second node 104 represents the bank for the first user. In an embodiment, the second node 104 refers to a node assembly. The node assembly includes a plurality of nodes. To validate the first type of transaction, the plurality of nodes may be required.

Moreover, the second node 104 functions to determine whether to validate a transaction in response to a transaction validation request from the first node 102, validate the transaction when some requirements are satisfied, and inform the first node 102 of an approval of the transaction using a P2P network when the second node 104 approves the validation. For example, when a balance in the account associated with the first user of the bank is not sufficient for a transaction, the second node 104 rejects a validation of the transaction and therefore the transaction is closed. Otherwise, the second node 104 approves the validation.

The third node 108 functions to receive the notification message from the first node 102 using a P2P network. The third node 108 is implemented with, for example, a server of the second user. That is, the third node 108 represents the second user.

The fourth node 106 has the same function as the second node 104 except that, for example, the fourth node 106 is in charge of a validation of a second type of transaction, different from the first type of transaction handled by the second node 104. For example, the fourth node 106 is implemented with, for example, a server of a merchant, or a bank server collaborated with the merchant for a loyalty point program. The merchant issues loyalty points, and manages an account of the first user. The first user has loyalty points in the account. That is, the fourth node 106 represents the merchant for the first user. In an embodiment, in a scenario in which the fourth node 106 represents a merchant issuing loyalty points and the first user initializes a transaction associated with the loyalty points, the fourth node 106 not only informs the first node 102 of an approval of the transaction, but also provides an information on a real currency equivalent to the loyalty points used to the first node 102.

The fifth node 114, for clarity of discussion, is identified as a single node. However, the fifth node 114 may alternatively represent a node assembly including a plurality of nodes in the blockchain network 10. The fifth node 114 functions to record the information, broadcasted by the first node 102, that does not include virtual currency.

The sixth node 110 is implemented with, for example, a server of a bank. The bank manages an account of the second user. The second user has real money in the account. That is, the sixth node 110 represents the bank for the second user. The sixth node 110 and the second node 104 function to settle the transaction therebetween based on the information in the ledger of the blockchain network 10. For example, the sixth node 110 and the second node 104 function to settle the transaction based on the information recorded in the copy of the ledger of the fifth node 114.

The seventh node 112 functions to, based on the information in the ledger, activate the second node 104 and the sixth node 110 to settle the transaction therebetween.

Figure 2:
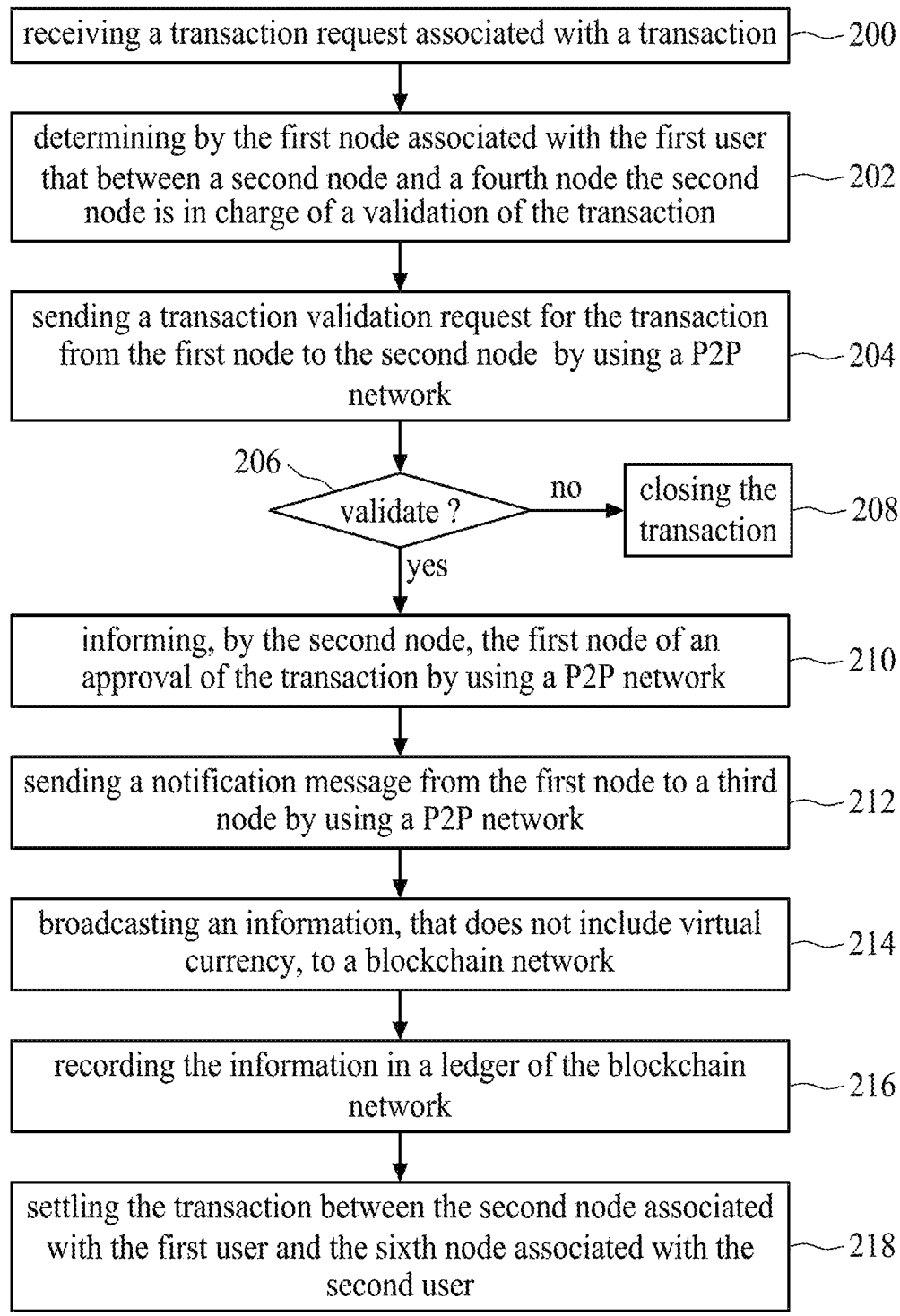
FIG. 2 is a flow diagram illustrating a method of operating the blockchain network shown in FIG. 1 in accordance with some embodiments of the present disclosure.

FIG. 2 is a flow diagram illustrating a method 20 of operating the blockchain network 10 shown in FIG. 1 in accordance with some embodiments of the present disclosure. Referring to FIG. 2, the method 20 includes operations 200, 202, 204, 206, 208, 210, 212, 214, 216 and 218.

The method 20 begins with operation 200, in which a transaction request associated with a transaction is received in response to an event in which a first user initializes the transaction with a second user. Referring back to FIG. 1, the first node 102 receives a transaction request associated with a transaction.

The method 20 then continues with operation 202, in which the first node associated with the first user determines that between a second node and a fourth node the second node is in charge of a validation of the transaction. Referring back to FIG. 1, for example, the second node 104 is in charge of a validation of a transaction associated with a real currency, and the fourth node 106 is in charge of a validation of a transaction associated with loyalty points. As such, the first user initializes a transaction associated with real currency, and the first node 102 determines that between the second node 104 and the fourth node 106 the second node 104 is in charge of a validation of the transaction associated with real currency.

Next, the method 20 continues with operation 204, in which a transaction validation request for the transaction is sent by the first node to the second node using a P2P network. Referring back to FIG. 1, the first node 102 sends a transaction validation request for the transaction to the second node 104 using a P2P network to request validation of the transaction; the first node 102 does not validate the transaction itself.

The method 20 proceeds with operation 206, in which, referring back to FIG. 1, the second node 104 determines whether to validate the transaction. If negative, the method 20 proceeds to operation 208, in which the transaction is closed. If affirmative, the method 20 proceeds to operation 210.

As previously mentioned, each of the nodes 102, 104, 106, 108, 110, 112 and 114 may have its own function. For example, the validation operation is performed by the single second node 104 (or the fourth node 106, depending on the type of transaction), instead of being performed by all of the nodes 102, 104, 106, 108, 110, 112 and 114. The subsequent proof of work (PoW) computation operation is also performed by the second node 104. As a result, performance of the blockchain network 10 is relatively high.

In some existing blockchain networks, all nodes in the existing blockchain network are homogeneous, and perform the same function. For example, a validation operation is performed by all of the nodes. All of the nodes perform the same validation operation, and then perform the subsequent proof of work (PoW) computation operation. When all of the nodes, or most of the nodes, reach consensus, the validation is approved. However, the nodes may not have the same computational speed. As such, some of the nodes may have already completed the validation operation and the PoW computation operation while other nodes may not yet have completed the validation operation and the PoW computation operation. Time would then be spent inefficiently waiting for other nodes to complete their operations. As such, performance of such blockchain network is relatively low.

In operation 210, the second node informs the first node of an approval of the transaction using a P2P network. Referring back to FIG. 1, the second node 104 informs the first node 102 of an approval of the transaction using a P2P network.

The method 20 proceeds with operation 212, in which a notification message indicating completion of the transaction is sent by the first node to a third node using a P2P network. Referring back to FIG. 1, the first node 102 sends a notification message indicating completion of the transaction to the third node 108 representing the second user using a P2P network. After the third node 108 receives the notification message, the transaction is complete. The completion of the transaction is earlier than a settlement operation, which will be described in operation 218. As a result, a real-time transaction can be achieved.

In some existing blockchain networks, as previously mentioned, when all nodes, or most of the nodes, in the existing blockchain network reach consensus, the validation is approved. In response to the approval of the validation, settlement operation is performed. After completion of the settlement operation, the common ledgers of all of the nodes in the existing blockchain network are synchronized, only then a transaction between two nodes is complete. That is, the completion of the transaction is after than the settlement operation. As a result, a real-time transaction cannot be executed.

Moreover, in the present disclosure, a transaction between the first user and the second user does not involve virtual currency. There is no need for the first user to convert his real currency through exchanges to buy and store virtual currency in a ledger of the blockchain network 10. Therefore, the first node 102 does not transfer virtual currency to the third node 108 during the process of the transaction.

The method 20 proceeds with operation 214, in which an information, that does not include virtual currency, is broadcasted to a blockchain network. Referring back to FIG. 1, the first node 102 only broadcasts information, that does not include virtual currency, to the blockchain network 10. Therefore, for both the first user and the second user, there is no risk of loss due to fluctuation in exchange rate between the real currency and the virtual currency.

The method 20 proceeds with operation 216, the information is recorded in a ledger of the blockchain network. Referring back to FIG. 1, for example, the fifth node 114 records the information, broadcasted by the first node 102, that does not include virtual currency.

Next, the method 100 continues with operation 218, in which the transaction is settled between the second node associated with the first user and a sixth node associated with the second user. Referring back to FIG. 1, the transaction is settled between the second node 104 and the sixth node 110. The completion of the transaction (i.e., operation 212) is earlier than a settlement operation (i.e., operation 218).

The method 20 is merely an example, and is not intended to limit the present disclosure beyond what is explicitly recited in the claims. Additional operations can be provided before, during, and after the method 20, and some operations described can be replaced, eliminated, or moved around for additional embodiments of the method.

Figure 3:
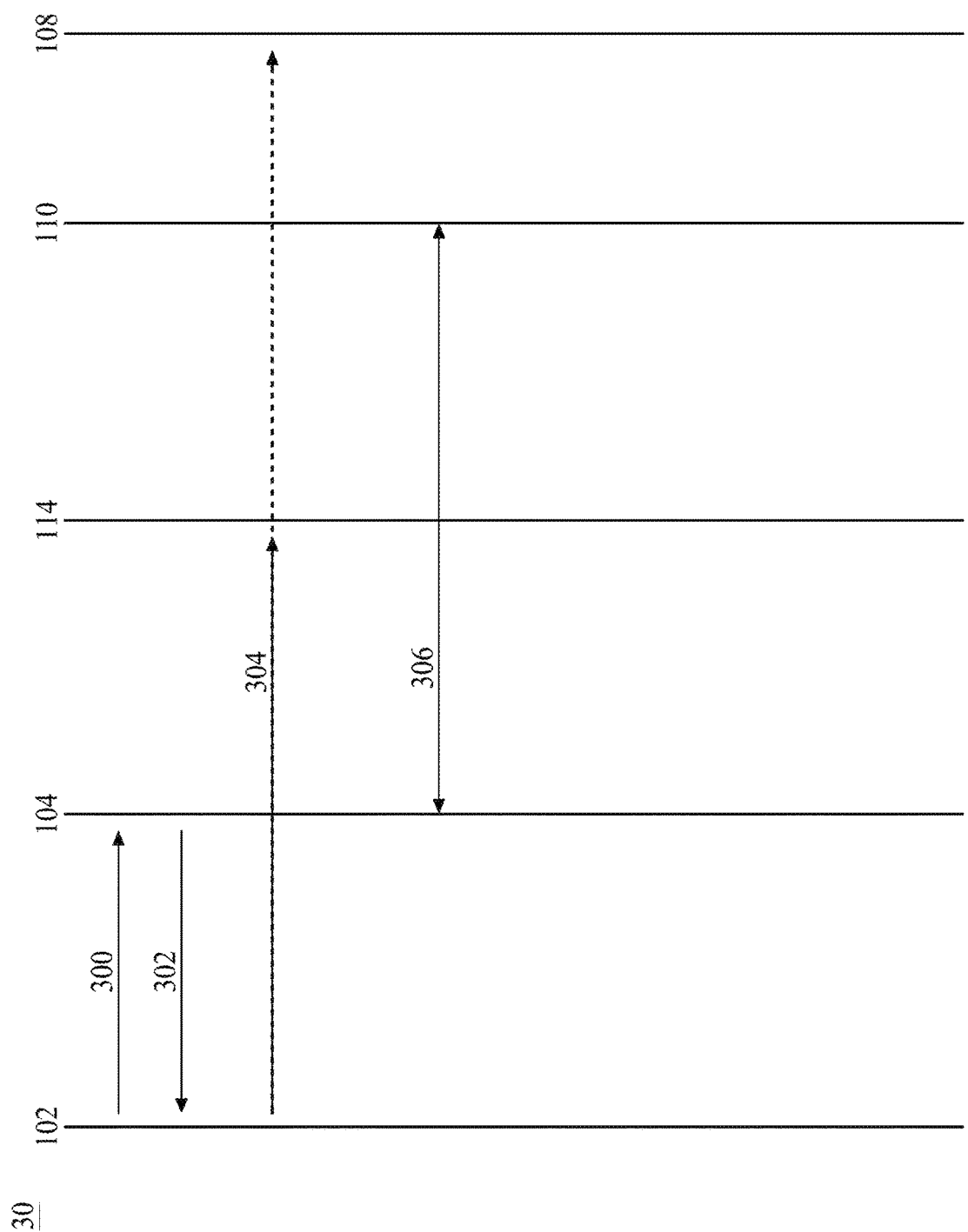
FIG. 3 is a time-entity flow diagram illustrating actions of the blockchain network in accordance with some embodiments of the present disclosure.

FIG. 3 is a time-entity flow diagram illustrating actions 30 of the blockchain network 10 in accordance with some embodiments of the present disclosure. Referring to FIG. 3, the flow diagram proceeds with entities mapped horizontally and time vertically. Time progresses from top to bottom.

In operation 300, referring back to FIG. 1, the first node 102 sends a transaction validation request for a transaction to the second node 104 using a P2P network. In operation 302, the second node 104 informs the first node 102 of an approval of the transaction using a P2P network. In operation 304, the first node 102 simultaneously broadcasts an information, that does not include a virtual currency, to the blockchain network 10, and sends the notification message to the third node 108. The information is recorded in the ledger of the blockchain network 10, or in a copy of the ledger of the fifth node 114. In operation 306, the sixth node 110 and the second node 104 settle the transaction therebetween based on the information in the copy of the ledger of the fifth node 114 (or the common ledger). The second user will receive his payment after the settlement while the second user is informed that the transaction is completed in operation 304. The completion of the transaction is earlier than a settlement operation. As a result, a real-time transaction can be achieved.

As mentioned above, the nodes 102, 104, 108, 110 and 114 of the blockchain system 10 are given different functions. As such, each of the nodes can be given a specific function different from each other depending on different transactions. Therefore, scalability of the blockchain system 10 is relatively high.

In some existing blockchain networks, all nodes in the existing blockchain network are homogeneous, and perform the same function. Therefore, scalability of the existing blockchain system is relatively low.

Figure 4:
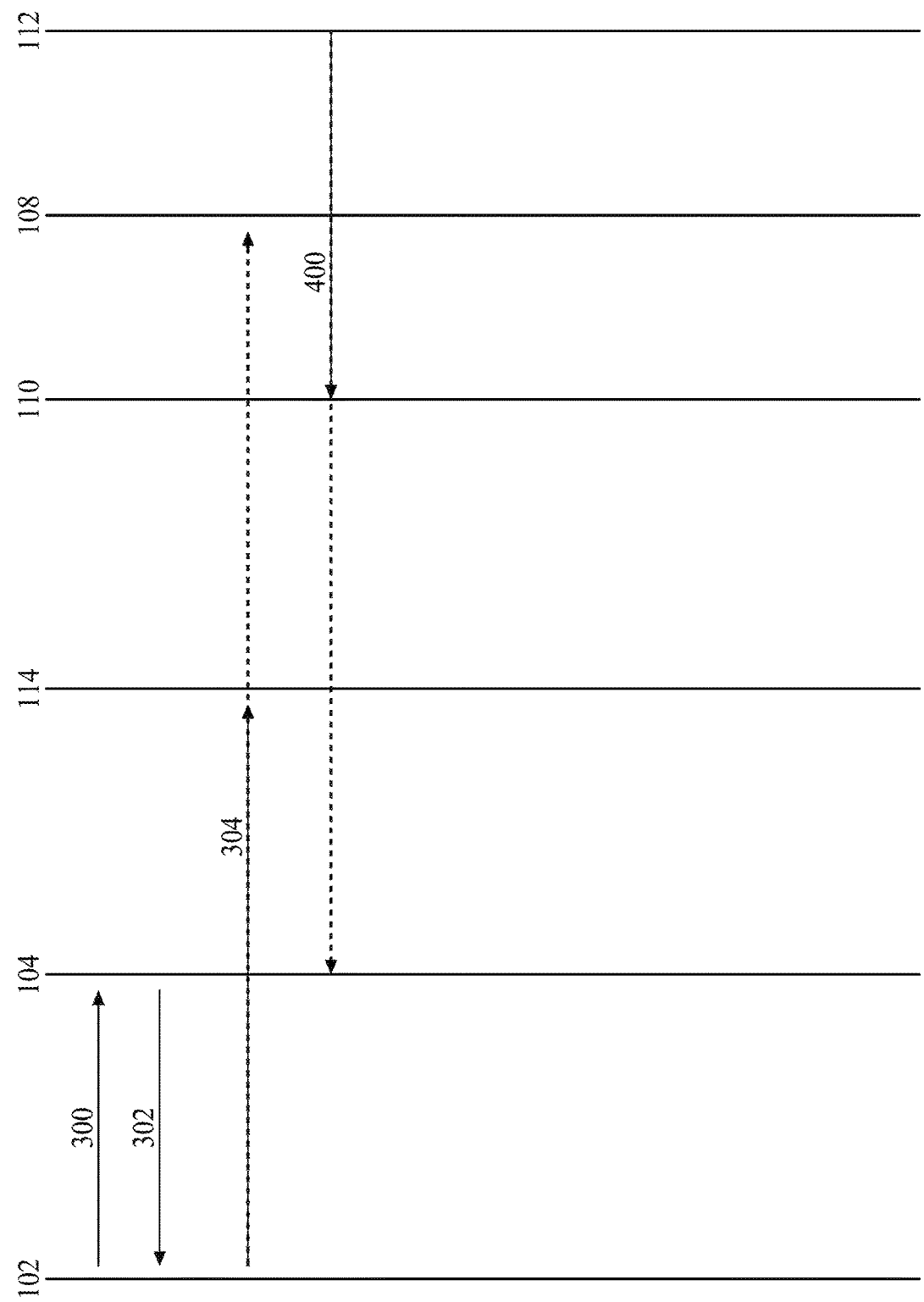
FIG. 4 is a time-entity flow diagram illustrating actions of the blockchain network in accordance with some embodiments of the present disclosure.

FIG. 4 is a time-entity flow diagram illustrating actions 40 of the blockchain network 40 in accordance with some embodiments of the present disclosure. Referring to FIG. 4, the actions 40 are similar to the actions 30 described and illustrated with reference to FIG. 3 except that, for example, the actions 40 include operation 400.

In operation 400, the seventh node 112, based on the information, activates the second node 104 and the sixth node 110 to settle the transaction therebetween.

Figure 5:
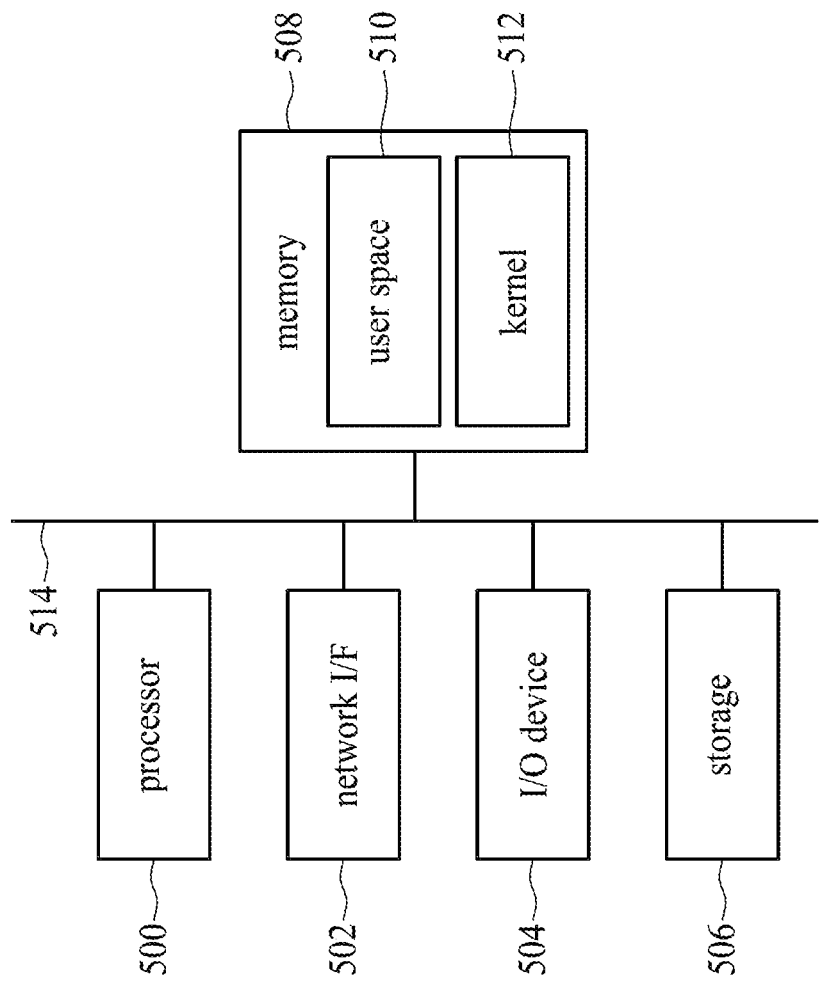
FIG. 5 is a block diagram of a hardware system for implementing the node of the blockchain network shown in FIG. 1 in accordance with some embodiments of the present disclosure.

FIG. 5 is a block diagram of a hardware system 50 for implementing the nodes 102, 104, 106, 108, 110 and 112 of the blockchain network 10 shown in FIG. 1 in accordance with some embodiments of the present disclosure. One or more of the tools, systems, or operations described with respect to FIGS. 1 to 4 are realized in some embodiments by one or more hardware systems 50. The hardware system 50 comprises a processor 500, a memory 508, a network interface (I/F) 502, a storage 506, and an input/output (I/O) device 504 communicatively coupled via a bus 514 or other interconnection communication mechanism.

The memory 508 comprises, in some embodiments, a random access memory (RAM), other dynamic storage device, read-only memory (ROM), or other static storage device, coupled to the bus 514 for storing data or instructions to be executed by the processor 500, e.g., a kernel 512, a user space 510, portions of the kernel or the user space, and components thereof. The memory 508 is also used, in some embodiments, for storing temporary variables or other intermediate information during execution of instructions to be executed by the processor 500.

In some embodiments, a storage device 506, such as a magnetic disk or optical disk, is coupled to the bus 514 for storing data or instructions, e.g., a kernel 512, a user space 510, etc. The I/O device 504 comprises an input device, an output device, or a combined input/output device for enabling user interaction with the system 50. An input device comprises, for example, a keyboard, a keypad, a mouse, a trackball, a trackpad, or cursor direction keys for communicating information and commands to the processor 500. An output device comprises, for example, a display, a printer, a voice synthesizer, etc. for communicating information to a user.

In some embodiments, one or more operations or functions of the tools or systems described with respect to FIGS. 1 to 4 are realized by the processor 500, which is programmed for performing such operations and functions. One or more of the memory 508, the I/F 502, the storage 506, the I/O device 504, the hardware components 718, and the bus 514 are operable to receive instructions, data, design rules, netlists, layouts, models and other parameters for processing by the processor 500.

In some embodiments, one or more of the operations, functions of the tools, and systems described with respect to FIGS. 2 to 7 are implemented by specifically configured hardware (e.g., by one or more application specific integrated circuits (ASICs), which are included) separate from or in lieu of the processor 500. Some embodiments incorporate more than one of the described operations or functions in a single ASIC.

In some embodiments, the operations and functions are realized as functions of a program stored in a non-transitory computer readable recording medium. Examples of a non-transitory computer readable recording medium include, but are not limited to, external/removable or internal/built-in storage or memory unit, e.g., one or more of an optical disk, such as a DVD, a magnetic disk, such as a hard disk, a semiconductor memory, such as a ROM, a RAM, a memory card, and the like.

In the present disclosure, each node of a blockchain network may have its own function. For example, a validation operation is performed by a single node of the nodes, instead of being performed by all of the nodes. The subsequent proof of work (PoW) computation operation is also performed by the single node. As a result, performance of the blockchain network is relatively high.

In contrast, in some existing blockchain networks, all nodes in the existing blockchain network are homogeneous, and perform the same function. For example, a validation operation is performed by all of the nodes. All of the nodes perform the same validation operation, and then perform the subsequent PoW computation operation. If all of the nodes, or most of the nodes, reach consensus, the transaction is approved. However, the nodes may not have the same computational speed. Therefore, some of the nodes may have already completed the validation operation and the PoW computation operation while other nodes may not yet have completed the validation operation or the PoW computation operation. Time would then be spent inefficiently waiting for other nodes to complete their operations. As such, performance of such blockchain network is relatively low.

Additionally, after a node representing a second user receives a notification message indicating completion of the transaction, the transaction is complete. The completion of the transaction is earlier than a settlement operation. As a result, a real-time transaction can be achieved.

In some existing blockchain networks, when all nodes, or most of the nodes, in the existing blockchain network reach consensus, the validation is approved. In response to the approval of the validation, settlement operation is performed. After completion of the settlement operation, the common ledgers of all of the nodes in the existing blockchain network are synchronized, only then a transaction between two nodes is complete. That is, the completion of the transaction is after than the settlement operation. As a result, a real-time transaction cannot be executed.

Moreover, in the present disclosure, a transaction between a first user and a second user does not involve virtual currency. There is no need for the first user to convert his real currency through exchanges to buy and store virtual currency in a ledger of a blockchain network. Therefore, a node representing the first user does not transfer virtual currency to another node representing the second user during the process of the transaction. The node only broadcasts information that does not include virtual currency to the blockchain network. Therefore, for both the first user and the second user, there is no risk of loss due to fluctuation in exchange rate between the real currency and the virtual currency.

In the present disclosure, nodes of a blockchain system are given different functions. As such, each of the nodes can be given a specific function different from each other depending on different applications. Therefore, scalability of the blockchain system is relatively high.

In contrast, in some existing blockchain networks, all nodes in the existing blockchain network are homogeneous, and perform the same function. Therefore, scalability of the existing blockchain system is relatively low.

One aspect of the present disclosure provides a blockchain network. Each node in the blockchain network is able to be dynamically assigned different function for a given transaction that can be executed in parallel. The blockchain network includes a first node configured to send a transaction validation request for a transaction using a P2P network; and a second node, configured to validate the transaction in response to the transaction validation request from the first node, and further configured to inform the first node of an approval of the transaction using a P2P network in response to the validation. The first node sends a notification message indicating completion of the transaction to a third node using a P2P network in response to the approval.

Another aspect of the present disclosure provides a method of operating a blockchain network. The method includes sending a transaction validation request for a transaction from a first node to a second node using a P2P network; validating the transaction by the second node in response to the transaction validation request from the first node; informing the first node of an approval of the transaction by the second node using a P2P network in response to the validation; and sending a notification message indicating completion of the transaction by the first node to a third node using a P2P network in response to the approval.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A blockchain network, each node in the blockchain network being able to be dynamically assigned different function for a given transaction that can be executed in parallel, the blockchain network comprising:
   a first node configured to send a transaction validation request for a first type transaction using a peer-to-peer (P2P) network; and
   a second node, configured to validate the first type transaction in response to the transaction validation request from the first node, and further configured to inform the first node of an approval of the first type transaction using a P2P network in response to the validation,
   wherein the first node sends a notification message indicating completion of the first type transaction to a third node using a P2P network in response to the approval,
   the first node, the second node and the third node each being configured to be dynamically assignable different functions for the first type transaction, the different functions of the first, second and third nodes being executable in parallel,
   the first node being configured to broadcast information that does not include a virtual currency to the second node and the third node in the blockchain network,
   the second node is implemented with a server managing an account of a user, and
   the blockchain includes a fourth node, in charge of a validation of a second type transaction different from the first type transaction handled by the second node.

2. The blockchain network of claim 1, wherein the first node is further configured to receive a transaction request associated with the transaction.

3. The blockchain network of claim 1, wherein the first node is further configured to determine that between the second node and a fourth node, the second node is in charge of a validation of the transaction.

4. The blockchain network of claim 1, wherein the first node is further configured to broadcast an information, which does not include a virtual currency, to the blockchain network.

5. The blockchain network of claim 4, wherein the first node simultaneously sends the notification message and broadcasts the information.

6. The blockchain network of claim 4, further comprising:
   a fifth node configured to record the information in a ledger of the blockchain network.

7. The blockchain network of claim 6, further comprising:
   a sixth node, wherein the sixth node and the second node are configured to settle the transaction therebetween based on the information in the ledger.

8. The blockchain network of claim 6, further comprising:
   a sixth node; and
   a seventh node configured to, based on the information, activate the second node and the sixth node to settle the transaction therebetween.

9. A method of operating a blockchain network, comprising:
   sending a transaction validation request for a first type transaction from a first node to a second node using a P2P network;
   validating the first type transaction by the second node in response to the transaction validation request from the first node;
   informing the first node of an approval of the first type transaction by the second node and by using a P2P network in response to the validation; and
   sending a notification message to a third node indicating completion of the first type transaction by the first node by using a P2P network in response to the approval, wherein
   the first node broadcasts information that does not include a virtual currency to the second node and the third node in the blockchain network,
   the second node is implemented with a server managing an account of a user, and
   the blockchain includes a fourth node, in charge of a validation of a second type transaction different from the first type transaction handled by the second node.

10. The method of operating the blockchain network of claim 9, further comprising:
    receiving a transaction request associated with the transaction by the first node.

11. The method of operating the blockchain network of claim 9, further comprising:
    determining by the first node that between the second node and a fourth node, the second node is in charge of a validation of the transaction.

12. The method of operating the blockchain network of claim 9, further comprising:
    broadcasting an information, that does not include a virtual currency, to the blockchain network by the first node.

13. The method of operating the blockchain network of claim 12, wherein the sending the notification message and broadcasting the information includes:
    simultaneously sending the notification message and broadcasting the information.

14. The method of operating the blockchain network of claim 12, further comprising:
    recording the information in a ledger of the blockchain network.

15. The method of operating the blockchain network of claim 14, further comprising:
    settling the transaction between a sixth node and the second node based on the information in the ledger.

16. The method of operating the blockchain network of claim 14, further comprising:
    activating the second node and a sixth node based on the information in the ledger to settle the transaction therebetween.

* * * * *